Figure 1:
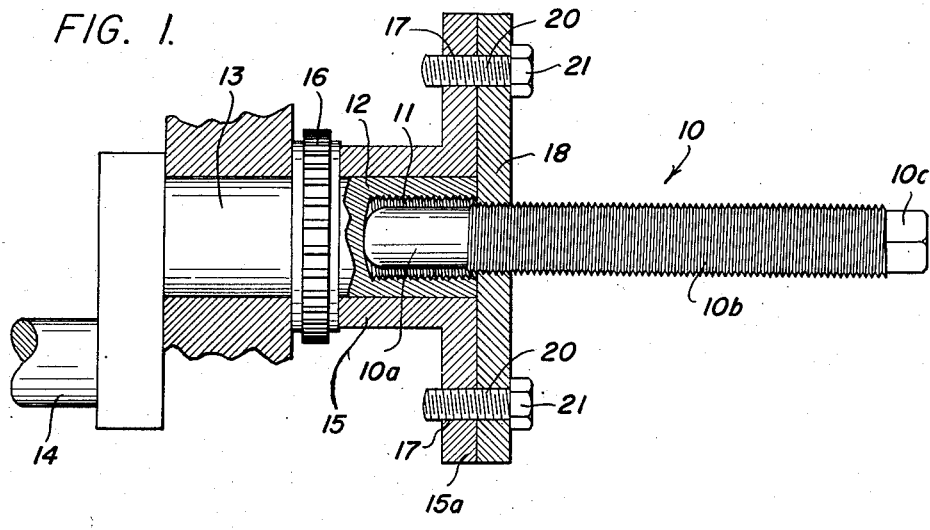

July 27, 1954  E. A. HEDLUND  2,684,527

METHOD OF REMOVING HUBS

Filed May 21, 1951

Inventor
EDWARD A. HEDLUND

Attorneys

Patented July 27, 1954

2,684,527

UNITED STATES PATENT OFFICE 2,684,527

METHOD OF REMOVING HUBS

Edward A. Hedlund, Salt Lake City, Utah

Application May 21, 1951, Serial No. 227,441

1 Claim. (Cl. 29—427)

This invention relates to tools known generally as hub pullers, and is concerned particularly with the method for removing crankshaft hubs of automotive engines and the like.

The engines of most modern automobiles and trucks are made with a counterbalancing hub pressed onto the forward extremity of the crankshaft. When certain repairs are to be made, it is necessary that this hub be removed. Tools presently available for this purpose require the exercise of considerable manual exertion in the actual pulling off of the hub, and the operation requires an undue length of time. Furthermore, the limitation of working space makes for considerable difficulty.

The purpose of the present invention is to provide a tool for easily removing such a counterbalancing hub from a crankshaft in a minimum of time and with practically no manual exertion, despite the limitation of working space.

In the accomplishment of this purpose, I construct the tool to utilize normal rotation of the crankshaft by the engine or starter as the motive power. Thus, it is only necessary to securely anchor the tool to the hub, and then manually hold a reaction element against rotation while operating the engine, to quickly and easily pull the hub from its tightly pressed fit on the crankshaft.

An outstanding feature of the tool of my invention is the employment of left hand threads in connection with a threaded reaction shaft, whose forward end is adapted to seat within the customary recessed terminus of the crankshaft. By the provision of a traveler element, threaded on this reaction shaft, and by temporarily securing such traveler element to the hub, it is possible to easily draw off the hub by merely operating the engine and manually holding the reaction shaft against rotation.

Further objects and features of the invention will become apparent from the following detailed description of the preferred specific embodiment illustrated in the accompanying drawing.

Figure 2:
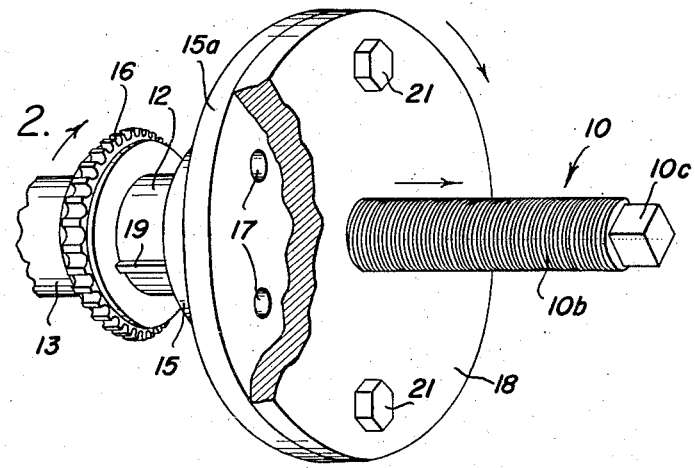

In the drawing:

Fig. 1 represents a central longitudinal section taken through the tool of the invention as applied to the crankshaft and crankshaft hub of an engine preparatory to removal of the hub; and Fig. 2, a perspective view looking from the front of the crankshaft, but from the rear of the tool as applied in Fig. 1, the hub being shown partially removed, and a portion of the traveler element of the tool being broken out to reveal otherwise hidden portions of the hub.

Referring now to the drawing: The tool of the invention comprises a threaded reaction shaft 10 having a pilot end 10a, Fig. 1, preferably of reduced diameter and without threads, adapted to fit into and abut against the bottom of the usual internally threaded recess 11 provided in the forward end of a crankshaft 12. The illustrated crankshaft is typical of those employed in modern automotive engines, and includes the usual forward main bearing 13 and a series of cranks 14.

The crankshaft hub 15 is of the usual formation, and is pressed snugly into position on the internally recessed forward extremity of the crankshaft 12 immediately in front of the timing chain sprocket 16. As so positioned, application of considerable pulling force is required for removing the hub from the crankshaft.

The hub 15 has a forwardly disposed, circumferential flange 15a, which is provided with a series of tapped holes 17 about its circumferential margin. These holes 17 normally provide screw anchorage for the securement of other parts of the engine assembly, commonly the fan belt pulley and a vibration dampener. However, in the use of the tool of the invention, such holes 17 provide for anchorage of a traveler element 18 to the hub.

The hub 15 is keyed to the forward extremity of the crankshaft, as is customary, by means of a key 19.

The traveler element 18 of the tool is preferably of disk formation, conforming generally in dimension with the forward flanged portion of the hub 15. It is provided with at least two oppositely disposed holes 20, which are not threaded, but are sufficiently large in diameter to accommodate respective cap screws 21, whose threaded shanks screw into the tapped holes 17.

When it is desired to remove the hub for the purpose of engine repairs, the tool may be quickly and easily secured in operative position by the screws 21 passing through respective sets of registering holes 17 and 20, threaded securement being achieved in the holes 20. The fan belt pulley and vibration dampener (not shown), which are normally bolted to the hub flange, may either be removed completely or merely two of the securing bolts may be removed, prior to application of the tool.

The reaction shaft 10 is threaded throughout the greater part of its length with left-hand threads 10b in order to take advantage of the normal clockwise rotation of the crankshaft 12 to motivate the hub-removing operation. The traveler element 18 is screwed onto the reaction shaft 10 for travel therealong, and that end of the reaction shaft opposite the pilot end 10a is squared, as at 10c, or otherwise suitably formed for receiving a wrench (not shown).

In using the tool of the invention following its installation as above described, a mechanic holds the reaction shaft 10 against rotation by applying a wrench to the squared end 10b. It is to be understood, of course, that the reaction shaft 10 is screwed forwardly in the traveler element 18 until its pilot end 10a is firmly seated against the somewhat concave bottom of the crankshaft recess 11, see Fig. 1.

He then operates the starter of the engine, preferably with the ignition turned off, thereby causing the engine to "turn over" and the crankshaft 12 to rotate in its normal clockwise direction, without actually starting the engine.

This normal clockwise rotation of the crankshaft 12, indicated by the adjacent arrow in Fig. 2, causes the hub 15 and the traveler element 18 of the tool to also rotate clockwise, and to ride or travel backwardly on the reaction shaft 10 that is to say forwardly of the forward end of the crankshaft and toward the end 10c of the reaction shaft, as indicated by the corresponding arrow in Fig. 2. This backward travel of the traveler element 18 on the lefthand threads of reaction shaft 10 carries with it the hub 15 to which the traveler element is securely fastened. During this time, it should be noted, the reaction shaft 10 remains stationary, becaues of its being held by the wrench as aforedescribed. The reaction thrust of the traveler element 18, and, therefore, of shaft 10, is against the crankshaft.

Rotation of the traveler member 18 and of the hub 15 in a clockwise direction, in company with the crankshaft 12, is indicated in Fig. 2 by an appropriately placed arrow. Since the showing in Fig. 2 is of the traveler element 18 and hub 15 at a partially advanced stage in their backward travel along the reaction shaft 10, hub 15 appears partially removed from its tightly pressed position on the forward extremity of the crankshaft.

When the hub is completely disengaged from the crankshaft, rotation of the crankshaft is stopped. The tool need merely be withdrawn from the crankshaft recess 11, and the hub 15 then separated from the traveler element by unscrewing the cap screws 21.

Following repair of the engine, the hub 15 may be re-installed in tightly pressed position on the forward extremity of the crankshaft 12 by the use of a hammer, punch, or other driving tool in customary manner. However, it is preferred that the hub-pushing or installing tool described and claimed in my copending application for Patent Ser. No. 238,423, filed May 21, 1951, be utilized for this purpose, since such tool also makes use of the motive power of the engine itself for the purpose and possesses essential advantages of the instant tool.

Whereas this invention is here illustrated and described with respect to a particular preferred form thereof, it should be understood that various changes may be made therein without departing from the spirit and scope of the invention as defined in the following claim.

I claim:

A method of removing a hub from a crankshaft on which it is tightly pressed, the said crankshaft being in place in an engine and rotatable clockwise therewith, comprising the steps of securing, to the said crankshaft hub, a traveler element which is screwed onto a left-hand threaded reaction shaft; seating one end of said reaction shaft against the forward end of the crankshaft on which the hub is mounted; operating the motor to turn said crankshaft in the direction of advance of said threads forwardly from said forward end of the crankshaft, while holding said reaction shaft against rotation, so as to cause said traveler element to automatically pull the hub from its said pressed fit; and disengaging the hub from said traveler element.

References Cited in the file of this patent

UNITED STATES PATENTS

| Number | Name | Date |
| --- | --- | --- |
| 82,161 | Regester | Sept. 15, 1868 |
| 1,508,494 | Allison | Sept. 16, 1924 |
| 2,363,804 | Reiland | Nov. 28, 1944 |

FOREIGN PATENTS

| Number | Country | Date |
| --- | --- | --- |
| 587,179 | France | Jan. 13, 1925 |